(12) United States Patent
Chang

(10) Patent No.: US 7,453,178 B2
(45) Date of Patent: Nov. 18, 2008

(54) VIBRATION MOTOR AND MOUNTING STRUCTURE OF THE VIBRATION MOTOR AND MOUNTING METHOD OF THE VIBRATION MOTOR

(75) Inventor: Dong-Geun Chang, Gwangiu-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 10/512,500

(22) PCT Filed: Jul. 16, 2003

(86) PCT No.: PCT/KR03/01408

§ 371 (c)(1),
(2), (4) Date: Oct. 26, 2004

(87) PCT Pub. No.: WO2004/008614

PCT Pub. Date: Jan. 22, 2004

(65) Prior Publication Data

US 2005/0173999 A1    Aug. 11, 2005

(30) Foreign Application Priority Data

Jul. 16, 2002    (KR) ........................ 10-2002-0041449

(51) Int. Cl.
*H02K 7/06* (2006.01)
(52) U.S. Cl. .......................................... 310/81; 310/71
(58) Field of Classification Search ................. 310/81, 310/71
See application file for complete search history.

(56) References Cited

U.S. PATENT DOCUMENTS

| | | | | |
|---|---|---|---|---|
| 4,096,625 A | * | 6/1978 | Morreale ..................... 29/596 |
| 4,157,482 A | * | 6/1979 | Kakinuma .................. 310/155 |
| 4,374,336 A | * | 2/1983 | Shimizu ................ 310/154.05 |
| 4,468,579 A | * | 8/1984 | Suzuki ........................ 310/208 |
| 4,555,685 A | * | 11/1985 | Maruyama .................. 335/303 |
| 5,036,239 A | * | 7/1991 | Yamaguchi .................. 310/268 |
| 5,235,230 A | * | 8/1993 | Yuhi et al. .................... 310/71 |
| 5,256,922 A | * | 10/1993 | Tanaka et al. ................. 310/71 |
| 5,498,919 A | * | 3/1996 | Bahn .......................... 310/268 |
| 5,600,193 A | * | 2/1997 | Matsushima et al. ....... 310/68 C |
| 5,793,133 A | * | 8/1998 | Shiraki et al. ................. 310/81 |
| 6,011,333 A | * | 1/2000 | Yamaguchi et al. ........... 310/81 |
| 6,051,900 A | * | 4/2000 | Yamaguchi .................. 310/81 |
| 6,160,329 A | * | 12/2000 | Ng ........................ 310/40 MM |

(Continued)

FOREIGN PATENT DOCUMENTS

CN    1161591 A    10/1997

(Continued)

*Primary Examiner*—Nguyen N Hanh
(74) *Attorney, Agent, or Firm*—Birch, Stewart, Kolasch & Birch, LLP

(57) ABSTRACT

A vibration motor includes: a rotor having an eccentric gravity center; a shaft inserted through a bearing of the rotor; a magnet provided at a position facing the rotor, at least one commutator circumferentially formed on a lower surface of the rotor; at least one pair of brushes being in contact with the commutator; a first terminal and a second terminal connected with the one pair of brushes and exposed to the external at their lower sides so as to be in contact with an electric line; and a base as a mold for fixing the first terminal and/or the second terminal thereto.

7 Claims, 4 Drawing Sheets

U.S. PATENT DOCUMENTS

| | | | |
|---|---|---|---|
| 6,359,364 B1 * | 3/2002 | Yamaguchi et al. | 310/248 |
| 6,566,776 B2 * | 5/2003 | Hoffmann et al. | 310/91 |
| 6,624,540 B2 * | 9/2003 | Fukuda et al. | 310/40 MM |
| 6,664,676 B1 * | 12/2003 | Yoshida et al. | 310/71 |
| 6,710,481 B2 * | 3/2004 | Yoshida et al. | 310/71 |
| 6,909,206 B2 * | 6/2005 | Koyanagi et al. | 310/43 |
| 2001/0011849 A1 * | 8/2001 | Yamaguchi | 310/71 |
| 2002/0047504 A1 * | 4/2002 | Takahashi | 310/DIG. 6 |
| 2003/0160529 A1 * | 8/2003 | Suzuki et al. | 310/90 |
| 2005/0173999 A1 * | 8/2005 | Chang | 310/81 |
| 2005/0248224 A1 * | 11/2005 | Park, II | 310/81 |

FOREIGN PATENT DOCUMENTS

| | | | |
|---|---|---|---|
| JP | 55-139058 A | | 10/1980 |
| JP | 61-258660 A | | 11/1986 |
| JP | 08205456 A | * | 8/1996 |
| JP | 09182355 A | * | 7/1997 |
| JP | 10-322970 A | | 12/1998 |
| JP | 10322970 A | * | 12/1998 |
| JP | 12-184662 A | | 6/2000 |
| KR | 2002-9408 A | | 2/2002 |

* cited by examiner

VIBRATION MOTOR AND MOUNTING STRUCTURE OF THE VIBRATION MOTOR AND MOUNTING METHOD OF THE VIBRATION MOTOR

TECHNICAL FIELD

The present invention relates to a vibration motor, and more particularly to a flat-typed vibration motor that can be simply fixed to a vibration generation location such as a portable phone or a pager only by easy working process, a mount structure of the flat-typed vibration motor and a mounting method for the flat-typed vibration motor.

BACKGROUND ART

Generally, a vibration motor is an apparatus that is installed in an electronic device such as a portable phone or a pager so as to transmit a predetermined signal to a user or to notify the user of an operation state of the electronic device.

Also, the conventional vibration motors are classified into a bar-typed vibration motor, a flat-typed vibration motor, etc. Recently, the flat-typed vibration motor has been popularized due to its much installation convenience and much vibration quantity.

FIG. 1 is a sectional view illustrating a conventional flat-typed vibration motor.

Referring to FIG. 1, the flat-typed vibration motor 10 includes a lower housing 8 and an upper housing 9 for protecting the internal thereof; a shaft 7 inserted into a central portion of the housings 8 and 9; and a rotor 6 formed in a circumference of the shaft 7 and having an eccentric gravity center. In this construction of the vibration motor, when the rotor 6 is rotated, a vibration is transmitted to the external via the shaft 7 and the housings 8 and 9.

In more particular, the vibration motor includes a current wire 1; a brush 2 for transmitting an input current to the rotor 6 via the current wire 1; a plurality of commutators 3 for alternatively transmitting the current thereto via the brush 2; a coil 4 formed within the rotor 6 so as to form an electro-magnetic field using the current transmitted via the commutators 3; a shaft 7 being a central rotary axis of the rotor 6; and a magnet 5 for forming a magnetic field interacting with the electro-magnetic field generated by the coil 4.

With reference to the above-described construction, an operation of the conventional flat-typed vibration motor will be described in detail.

In the coil 4 to which the current is transmitted via the current wire 1, the brush 2 and the commutator 3, the electromagnetic field is formed, and the rotor 6 is rotated using an electromagnetic force generated between the coil 4 and the magnet 5. In particular, due to the eccentric rotor 6, when the rotor 6 is rotated at a high speed, the vibration is generated therefrom and thus the generated vibration is transmitted to the external through the shaft 7 and the housings 8 and 9.

FIG. 2 is a view illustrating a mount structure of a conventional flat-typed vibration motor.

Referring to FIG. 2, the conventional mount structure includes the flat-typed vibration motor 10; a boss 11 formed in a predetermined position of the vibration generation location such as the portable phone or the pager so as to insert the flat-typed vibration motor 10 therethrough in the same contour shape as that of the flat-typed vibration motor 10; a both-sided tape 12 adhered to a lower surface of the flat-typed vibration motor 10; a cushion pad 13 inserted on an upper side of the flat-typed vibration motor 10; an upper case 14 formed on an upper side of the cushion pad 13, to be combined to the boss 11 so as to fix the flat-typed vibration motor 10 thereto.

A procedure of mounting the vibration motor using the mount structure of the conventional vibration motor 10 will be described in detail. By attaching the both-sided tape 12 to the lower surface of the flat-typed vibration motor 10, the vibration motor 10 is seated within the boss 11. And, a support case 14 is formed over the vibration motor 10 such that the vibration motor 10 is seated more stably.

Further, the cushion pad is formed between the support case 14 and the vibration motor 10 such that the vibration motor is prevented from being unstably shaken. As a result, the vibration motor 10 is not only stably fixedly positioned, but also much vibration quantity can be transmitted to the external.

However, a conventional support structure of the flat-typed vibration motor has a disadvantage in which a plurality of parts is employed thereby increasing the number of process.

Further, the conventional support structure has another disadvantage in which the number of parts is increased thereby resulting in a cost increase.

Furthermore, the conventional support structure has a still another disadvantage in which, though the vibration motor 10 is once again fixed on its upper side using the cushion pad 13, since the vibration motor is not stably fixed, as an operation period is totally lengthen, the vibration motor is separated from the boss thereby causing a poor vibration transmittance or decreasing the vibration quantity.

Additionally, the conventional support structure has a further disadvantage in which a user manually inserts all of the vibration motors into the boss in the vibration generation location, and in which, though automation installations are employed, the number of manufacture process is increased.

DISCLOSURE OF THE INVENTION

Accordingly, the present invention is directed to a flat vibration motor that substantially obviates one or more of the problems due to limitations and disadvantages of the related art.

An object of the present invention is to provide a vibration motor that can be more stably strongly fixed to a portable phone and a pager, a mount structure of the vibration motor and a mounting method for the vibration motor.

Another object of the present invention is to provide a vibration motor and a mount structure of the vibration motor in which the vibration motor can be more conveniently simply fixed in a vibration generation location.

A further object of the present invention is to be capable of easily and simply supporting the vibration motor thereby improving a yield of the vibration motor.

To achieve the above objects and other advantages, the present invention provides a vibration motor including: a rotor having an eccentric gravity center; a shaft inserted through a bearing of the rotor; a magnet provided at a position facing the rotor; at least one commutator circumferentially formed on a lower surface of the rotor; at least one pair of brushes being in contact with the commutator; a first terminal and a second terminal connected with the one pair of brushes and exposed to the external at their lower sides so as to be in contact with an electric line; and a base as a mold for fixing the first terminal and/or the second terminal thereto.

In another aspect of the present invention, there is provided a vibration motor including: an eccentric rotor having a coil formed therein; a shaft inserted through the rotor; a terminal for applying a current to the rotor; a base insert-injected so as to expose one end of the terminal to the external with its position being fixed; and a housing for protecting parts other than the base, from the external.

In a still another aspect of the present invention, there is provided a mount structure of a vibration motor for generating a vibration using a rotor with an eccentric gravity center, the mount structure including: a first terminal and a second terminal electrically connected with a brush, each having one end exposed to the external; a base insert-injected in a state that at least one of the first and second terminals is placed; a substrate electrically contacting with an exposed portion of the first and second terminals; and a solder part formed on a contact surface between the substrate and the first and second terminals.

In a yet still another aspect of the present invention, there is provided a mounting method of a vibration motor, the mounting method including the steps of: coating a solder cream on a predetermined portion of a substrate to which the vibration motor is fixed; putting the vibration motor on the substrate such that the first and second terminals are in contact with the solder cream, the first and second terminals being exposed to the external at one side of the vibration motor so as to apply an external power to the vibration motor; and heating and fusion-attaching the solder cream.

The above-described inventive support structure of the vibration motor has an advantage in that the vibration motor can be more securely supported thereby increasing the vibration quantity transmitted to the external.

Further, the above-described inventive support structure of the vibration motor has another advantage in which the vibration motor can be simply mounted thereby resulting in effective production thereof.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Hereinafter, preferred embodiments of the present invention will be described in detail with reference to the attached drawings.

Figure 1:
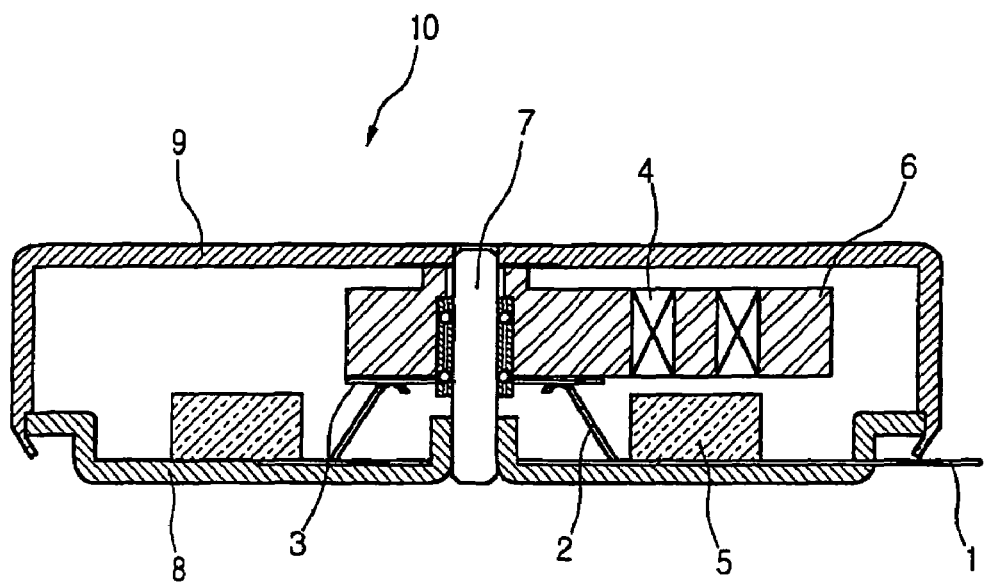
FIG. 1 is a sectional view illustrating a conventional flat-typed vibration motor.
Figure 2:
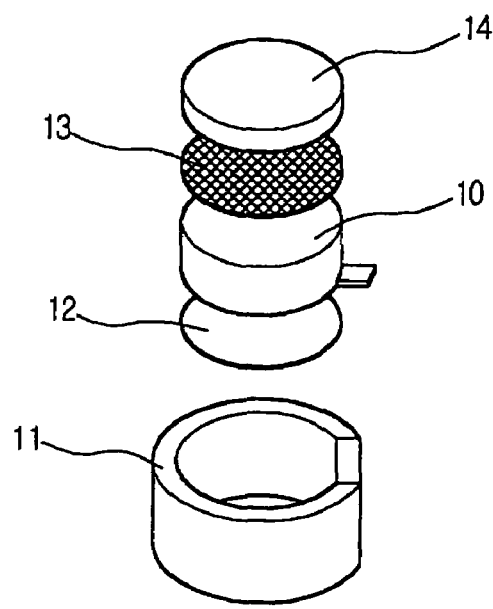
FIG. 2 is a view illustrating a mount structure of a conventional flat-typed vibration motor.
Figure 3:
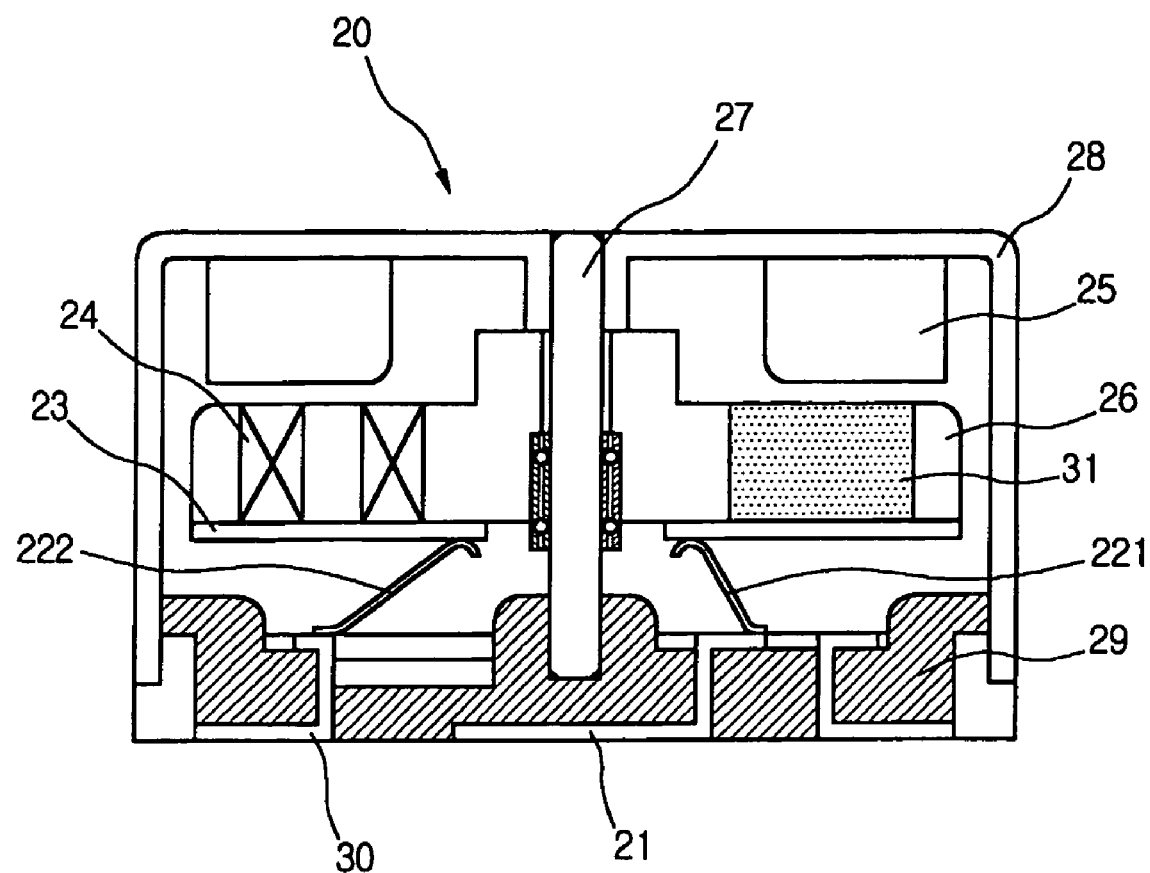
FIG. 3 is a sectional view illustrating a vibration motor and a mount structure thereof according to a preferred embodiment of the present invention.

FIG. 3 is a sectional view illustrating a vibration motor and a mount structure thereof according to a preferred embodiment of the present invention.

Referring to FIG. 3, in a vibration motor, particularly, in a flat-typed vibration motor 20, unlike a conventional vibration motor, a structure modification of a lower housing is characterized.

In detail, first and second terminals 21 and 30 are formed on a lower side of the vibration motor 20 so as to be electrically connected with lower ends of brushes 221 and 222. Additionally, a base 29 is formed so as to fix the first and second terminals 21 and 30, and support a shaft 27.

In particular, the base 29 is molded of resin material, and preferably, the resin-material mold can be formed using an insert injection molding and at the same time, the first and second terminals 21 and 30 are fixed.

A construction of the vibration motor 20 according to the present invention will be described in detail.

The vibration motor 20 includes the first terminal 21 for inputting an external current thereto; a first brush 221 for providing the input current of the first terminal 21 for a rotor 26; a commutator 23 for alternating the current of the first brush 221 to provide the alternate current for the rotor 26; a coil 24 having one end connected with the commutator 23, for supplying the current thereto to thereby form an electric field by the supplied current; a second brush 222 electrically connected with the other end of the coil 24; and the second terminal 30 connected with the second brush 222.

In particular, the first and second terminals 21 and 30 can be, at the same time of insert-injection, fixed using the base 29 formed by an insert injection molding.

Further, a magnet 25 fixed to an inner surface of the upper housing 28 is formed on an upper side of the rotor 26 so as to allow the rotor 6 to rotate by interaction with the electromagnetic field generated by the coil 24. Furthermore, a weight 31 can be internally formed in a predetermined position of an internal circumference of the rotor 26 so as to allow a rotary center of the rotor 26 to be eccentrically positioned.

Further, the shaft 27 has a position of upper and lower ends vertically set by the upper housing 28 and the base 29. In particular, the lower end of the shaft 27 is fixed to the base 29 and a predetermined bearing structure is formed between the shaft 27 and the rotor 26 such that the rotor 26 and the shaft 27 are preferably relatively rotated with respect to each other.

Figure 4:
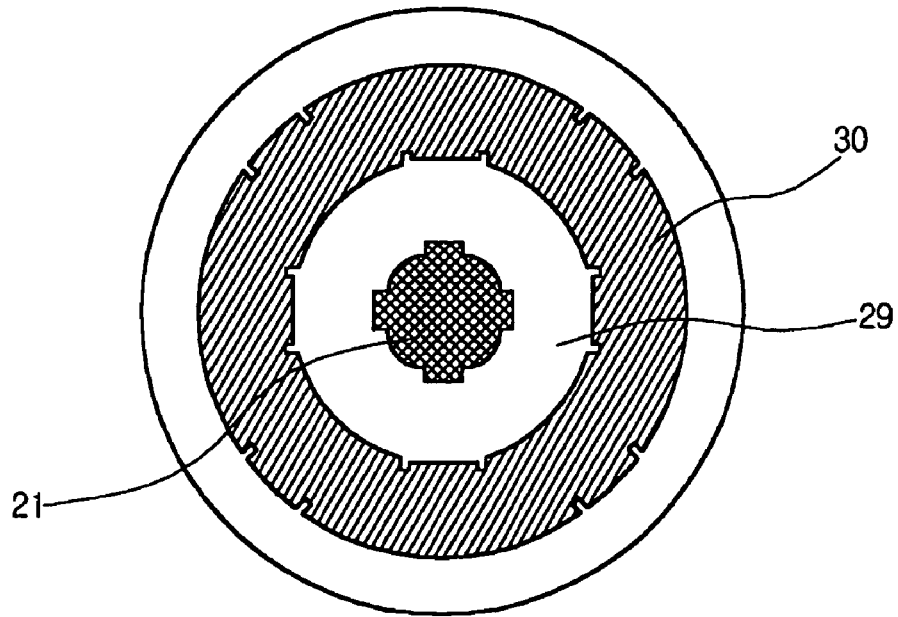
FIG. 4 is a bottom view illustrating a vibration motor according to a preferred embodiment of the present invention.

FIG. 4 is a bottom view illustrating a vibration motor according to a preferred embodiment of the present invention.

Referring to FIG. 4, the first terminal 21 is circularly formed over a wide area in a central portion of a lower surface of the vibration motor 20, and the second terminal 30 is doughnut-shaped over a wide area in an exterior portion of the lower surface of the vibration motor 20. That is, the first terminal 21 and the second terminal 30 can be formed concentrically.

As described above, the first and second terminals 21 and 30 is formed over the wide area such that an electrical connection is securely made and the vibration motor 20 is more securely fixed to the printed circuit board.

With reference to the construction shown in FIGS. 3 and 4, a procedure of fixing the vibration motor 20 to a portable phone and a pager will be described.

In the inventive vibration motor 20, a current wire is not individually formed, and the terminals 21 and 30 in place of current input/output lines are formed on a lower side of the vibration motor 20. Additionally, the terminals 21 and 30 serve to securely fix the vibration motor 20 onto the printed circuit board.

In detail, the terminals are formed over the wide area in a central portion and an exterior circumference of the lower surface of the vibration motor 20.

On the other hand, the above fixing way is called a surface mount device (SMD) way in which one surface of a part is directly fixed to an object member.

In more detail, a procedure of fixing the vibration motor onto the printed circuit board will be described.

Figure 5:
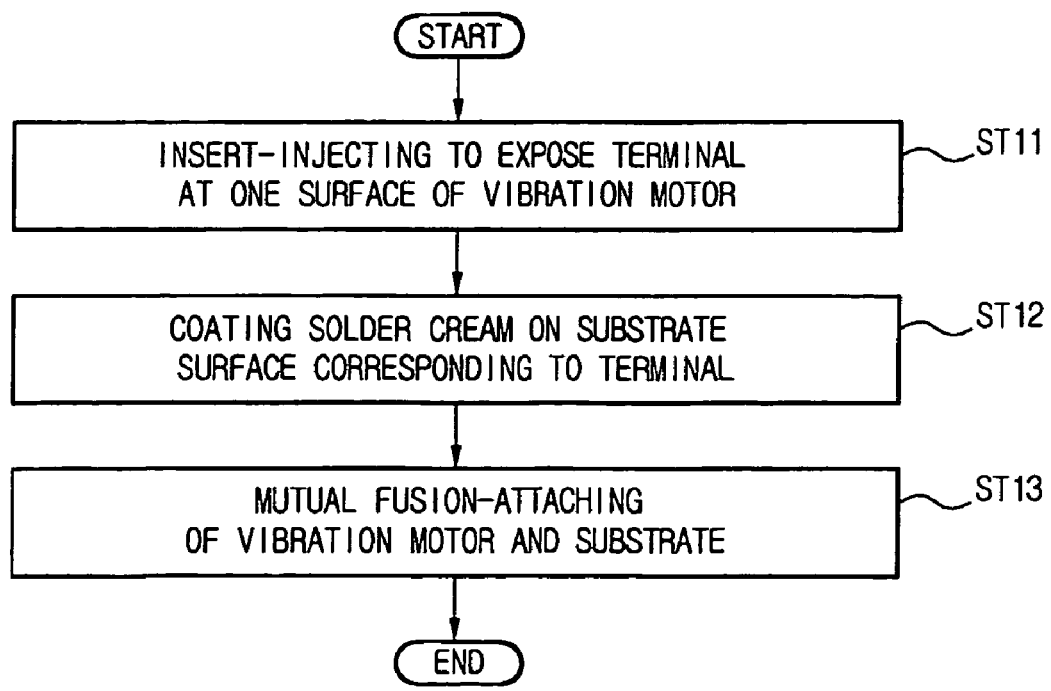
FIG. 5 is a flow chart illustrating a mounting method of a vibration motor according to a preferred embodiment of the present invention.

FIG. 5 is a flow chart illustrating a mounting method of the vibration motor according to a preferred embodiment of the present invention.

Referring to FIG. 5, the terminal for inputting/outputting the current is insert-injected using the resin-material mold so as to have its one end exposed to the external at one side of the vibration motor (ST11). In detail, one ends of the terminals 21 and 30 is respectively exposed to the external using the insert injection molding while one side of the vibration motor is fixed to and clogged by the base 29. In this step, it is important that lower one ends of the terminals 21 and 30 are not clogged by the resin-material mold.

Further, a solder cream is coated on a position of a printed circuit board to which the vibration motor 20 is fixed (ST12). In particular, the position having the solder cream coated is a position in which the terminals 21 and 30 are formed. On the other hand, the solder cream uses an article already well known as a material containing a lead and a tin and existing in a liquid state in a room temperature.

Further, the vibration motor is put on the printed circuit board having the solder cream covered. Additionally, the printed circuit board having the vibration motor put thereon passes through a heating means exemplified as a reflow machine such that the vibration motor and the printed circuit board are connected to each other by a fusion-attaching (ST13).

In the reflow machine, a heat is applied in an appropriate temperature of fusing the solder cream such that an electrical conductive material such as the lead contained in the solder cream is fused to electrically connect the terminals 21 and 30 with a specific point of the printed circuit board.

As described above, after the vibration motor 20 and the printed circuit board are connected with each other, the vibration motor 20 is connected, through the wide area of terminals as shown in FIG. 4, to the printed circuit board such that the vibration motor 20 and the printed circuit board can be securely fixed with more strong force. Additionally, a conductive line of the printed circuit board and the terminals 21 and 30 are electrically connected with each other such that the external current can be inputted to the vibration motor 20.

On the other hand, the magnet 25 is formed on the upper side of the rotor 26, and it is such that the magnet 25 does not interfere in formation of the base 29 and can further reduce a total size of the vibration motor 20.

Figure 6:
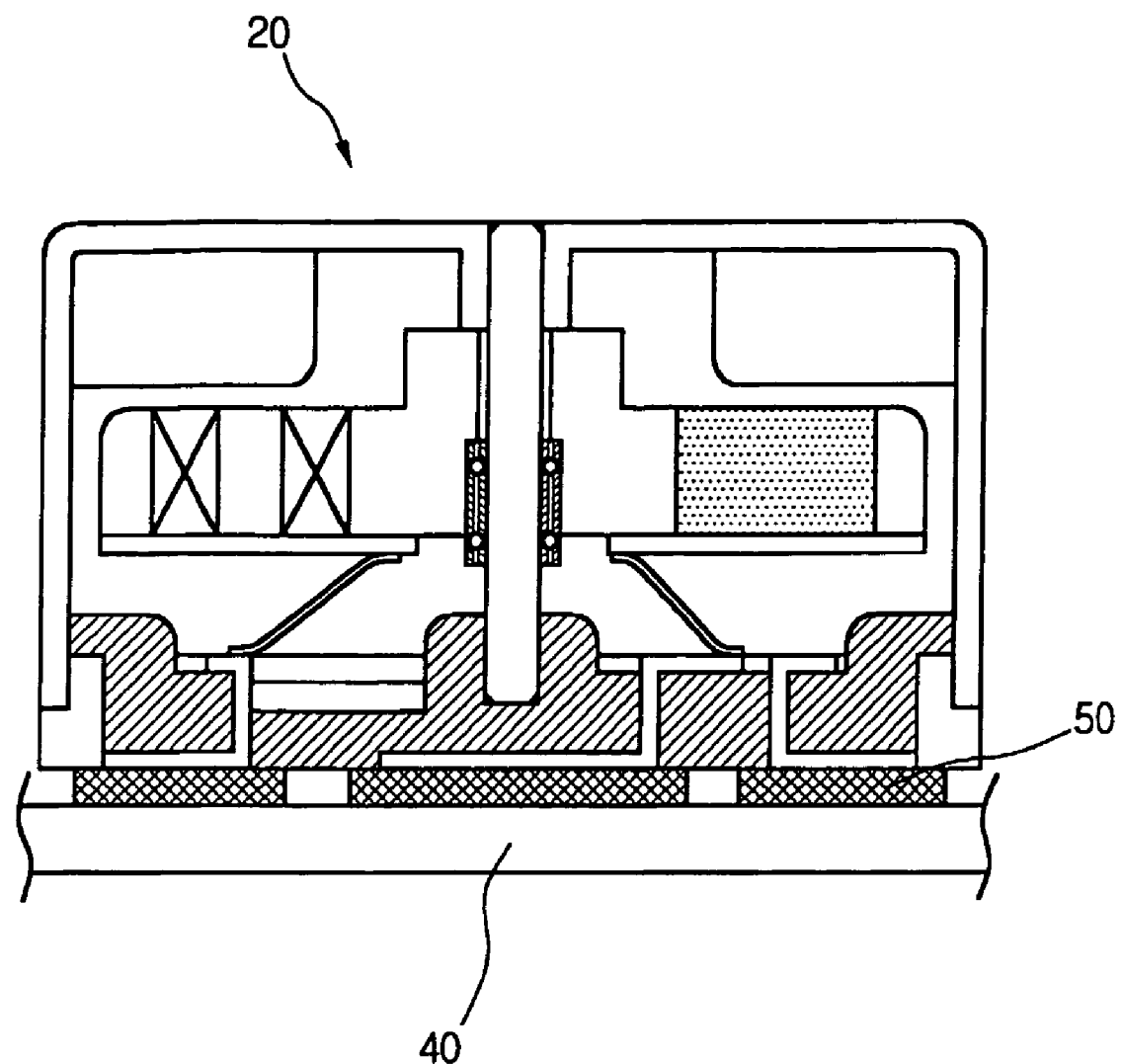
FIG. 6 is a view illustrating a state in which a vibration motor is mounted on a printed circuit board according to a preferred embodiment of the present invention.

FIG. 6 is a view illustrating a state in which a vibration motor is mounted onto the printed circuit board according to a preferred embodiment of the present invention.

Referring to FIG. 6, there are illustrated the printed circuit board 40 and the vibration motor 20 connected to an upper surface of the printed circuit board 40. Additionally, the solder 50 is formed on a contact surface of the vibration motor 20 and the printed circuit board 40 so as to input/output the current through the solder 50. Additionally, using the solder 50, the vibration motor 20 is securely fixed.

Further, the solder 50 is formed over an area wider than an area of the first and second terminals 21 and 30 such that the vibration motor 20 can be easily stably fixed to the printed circuit board. However, each of the solder part 50 is required not to be short-circuited.

In particular, the solder 50 is formed on a wide portion of the contact surface between the vibration motor 20 and the printed circuit board 40, so as to perform a strong attaching function of the vibration motor 20 to the printed circuit board 40 as well as a conducting function.

In the vibration motor 20 and the printed circuit board 40 connected to have the above construction and shape, the vibration generated from the vibration motor 20 can be all transmitted to the printed circuit board 40, and resultantly, the transmitted vibration can be strongly transmitted to the portable phone or the pager, etc. thereby providing an effect of allowing the user to use them much more conveniently.

The printed circuit board 40 is allowed to easily connect with the vibration motor 20 or the terminals 21 and 30. It is enough for the printed circuit board 40 to function only as the electrical conductive part where the current input/output line is formed for transmitting the current, and whatever such as an exterior case of the electronic device can be employed as the electrical conductive part. The present invention is characterized in its scope by the structure of the vibration motor, the mount structure of the vibration motor, and a mounting method for the vibration motor, and other constructions can be employed though they are structured differently.

Although the preferred embodiments of the present invention have been disclosed for illustrative purpose, those skilled in the art will appreciate that various modifications, additions and substitutions can be made without departing from the scope and spirit of the invention as defined in the accompanying claims.

INDUSTRIAL APPLICABILITY

The support structure of the vibration motor according to the present invention has an advantage in which, since an inter-medium is not provided for transmitting the vibration generated from the vibration motor, the vibration transmittance in the vibration motor can be maximized.

Further, the support structure of the vibration motor according to the present invention has another advantage in which the stability can be maintained due to its firmness even after a long time.

Furthermore, the inventive support structure of the vibration motor has a still another advantage in which an employment of a plurality of parts is restrained and only a heating process using an appropriate temperature is applied in a state in which the solder cream is coated, to thereby reduce the number of manufacture process and provide more advantageous effect in an automated manufacture process.

Additionally, the inventive support structure of the vibration motor has a further another advantage in which the needed number of parts can be reduced thereby reducing a manufacture cost.

The invention claimed is:

1. A vibration motor comprising:
a rotor having an eccentric gravity center;
a shaft inserted through a bearing of the rotor;
a magnet provided at a position facing the rotor;
at least one commutator circumferentially formed on a lower surface of the rotor;
at least one pair of brushes being in contact with the commutator;
a first terminal and a second terminal connected with the one pair of brushes;
a base as a mold for fixing the first terminal and/or the second terminal thereto, the base having a bottom surface; and
extended portions of the first terminal and the second terminal extending through the bottom surface of the base for connection with an electrical conductor,
wherein the bottom surface of the base includes at least one groove and the extended portions of the first terminal and the second terminal are fixed to the at least one groove, wherein the bottom surface of the base and the lower surface of the extended portions are formed on the same horizontal planes, and wherein the extended portion of the first terminal is surrounded by the extended portion of the second terminal.

2. The vibration motor of claim 1, wherein the base is insert-injected base.

3. The vibration motor of claim 1, wherein a portion of the extended portion of the first terminal and the shaft are formed on the same vertical plane.

4. The vibration motor of claim 1, wherein portions of the brushes, rotor and magnet are formed on the same vertical plane.

5. The vibration motor of claim 1, wherein the magnet is formed at an opposite side to the brushes with reference to the rotor.

6. The vibration motor of claim 1, wherein a substrate is in electrical contact with the exposed portions of the first and second terminals; and further comprising solder parts formed on a contact surface between the substrate and the first and second terminals, wherein a first solder part formed on a contact surface between the substrate and the first terminal is separated with a second solder part formed on a contact surface between the substrate and the second terminal.

7. The vibration motor of claim 1, wherein the terminals run along the bottom of the base, one side of each terminal facing away from the bottom of the base.

* * * * *